(12) United States Patent
Martin et al.

(10) Patent No.: US 10,366,229 B2
(45) Date of Patent: Jul. 30, 2019

(54) METHOD FOR DETECTING A CYBER ATTACK

(71) Applicant: Jask Labs Inc., San Francisco, CA (US)

(72) Inventors: Gregory Martin, San Francisco, CA (US); Thomas Piscitell, III, San Francisco, CA (US); David Matslofva, Redwood City, CA (US)

(73) Assignee: JASK Labs Inc., San Francisco, CA (US)

( * ) Notice: Subject to any disclaimer, the term of this patent is extended or adjusted under 35 U.S.C. 154(b) by 61 days.

(21) Appl. No.: 15/628,196

(22) Filed: Jun. 20, 2017

(65) Prior Publication Data

US 2018/0004942 A1 Jan. 4, 2018

Related U.S. Application Data

(60) Provisional application No. 62/352,323, filed on Jun. 20, 2016.

(51) Int. Cl.
*H04L 29/06* (2006.01)
*G06F 21/55* (2013.01)

(52) U.S. Cl.
CPC .......... *G06F 21/552* (2013.01); *G06F 21/554* (2013.01); *H04L 63/1416* (2013.01); *H04L 63/1425* (2013.01); *H04L 63/1433* (2013.01)

(58) Field of Classification Search
CPC ..... G06F 21/552; G06F 21/554; H04L 63/20; H04L 63/1416; H04L 63/145; H04L 63/1425; H04L 63/1433; H04L 63/1441
USPC .................................................. 726/22–26
See application file for complete search history.

(56) References Cited

U.S. PATENT DOCUMENTS

| | | | | |
|---|---|---|---|---|
| 7,669,241 | B2* | 2/2010 | Ganguly | H04L 29/06027 726/22 |
| 8,364,833 | B2* | 1/2013 | Bennett | H04L 63/0245 709/230 |
| 8,612,564 | B2* | 12/2013 | Swildens | G06F 9/505 709/202 |
| 8,689,328 | B2* | 4/2014 | Ormazabal | H04L 63/123 726/22 |
| 9,342,691 | B2 | 5/2016 | Maestas | |
| 9,648,029 | B2* | 5/2017 | Cheng | H04L 63/1416 |
| 9,769,276 | B2* | 9/2017 | Bennett | H04L 63/0245 |

(Continued)

*Primary Examiner* — Hosuk Song
(74) *Attorney, Agent, or Firm* — Run8 Patent Group, LLC; Peter Miller

(57) ABSTRACT

One variation of a method for detecting a cyber attack includes: recording representations of network events occurring on a network over a period of time to a network accounting log; writing metadata values of network events in the accounting log to a compressed log file; in response to receipt of a new threat intelligence representing a newly-identified security threat identified after the period of time, querying the compressed log file for a set of metadata values of a threat element defined in the new threat intelligence; in response to detecting the set of metadata values of the threat element in the compressed log file, querying the network accounting log for a set of threat elements defined in the new threat intelligence; and in response to detecting the set of threat elements in the network accounting log, issuing an alert to respond to the newly-identified security threat on the network.

18 Claims, 3 Drawing Sheets

(56) References Cited

U.S. PATENT DOCUMENTS

2011/0138468 A1 6/2011 Chaudhry et al.
2016/0226895 A1 8/2016 Huang et al.

\* cited by examiner

METHOD FOR DETECTING A CYBER ATTACK

CROSS-REFERENCE TO RELATED APPLICATIONS

This Application claims the benefit of U.S. Provisional Application No. 62/352,323, filed on 20 Jun. 2016, which is incorporated in its entirety by this reference.

TECHNICAL FIELD

This invention relates generally to the field of cyber security and more specifically to a new and useful method for detecting a cyber attack in the field of cyber security.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
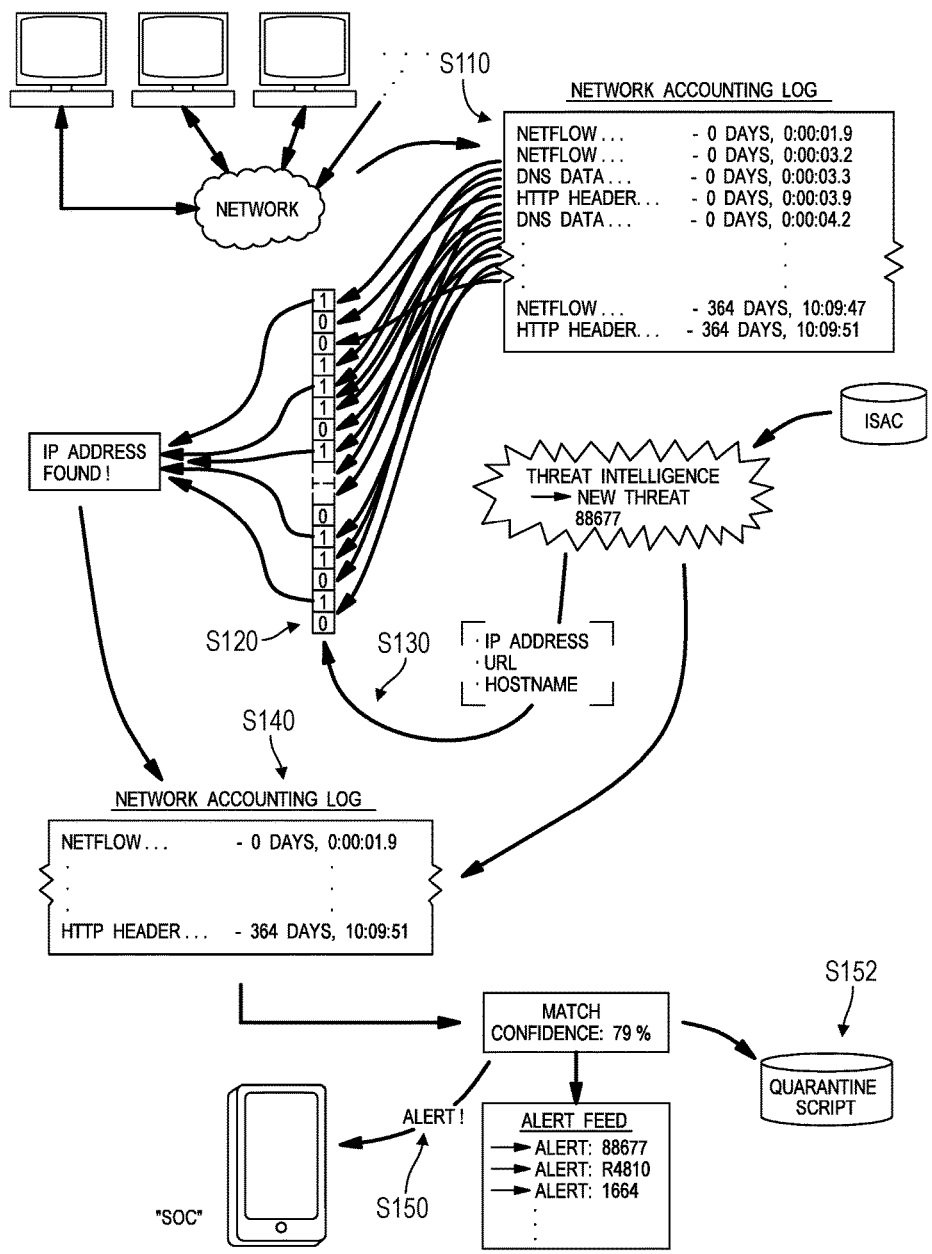
FIG. 1 is a flowchart representation of a method.

As shown in FIG. 1, a method S100 for detecting a cyber attack includes: recording representations of network events occurring on a network over a period of time to a network accounting log in Block S110; compressing the network accounting log into a compressed log file representing the network events occurring within the period of time in Block S120; in response to receipt of a new threat intelligence representing a newly-identified security threat identified after the period of time, querying the compressed log file for a value representative of a threat element defined in the new threat intelligence in Block S130; in response to detecting the threat element in the compressed log file, querying the network accounting log for the threat element in Block S140; and in response to detecting the threat element in the network accounting log, issuing an alert to respond to the security threat on the network in Block S150.

One variation of the method S100 includes: recording representations of network events occurring on a network over a period of time to a network accounting log in Block S110; writing metadata values of network events in the accounting log to a compressed log file in Block S120; in response to receipt of a new threat intelligence representing a newly-identified security threat identified after the period of time, querying the compressed log file for a set of metadata values of a threat element defined in the new threat intelligence in Block S130; in response to detecting the set of metadata values of the threat element in the compressed log file, querying the network accounting log for a set of threat elements defined in the new threat intelligence in Block S140; and in response to detecting the set of threat elements in the network accounting log, issuing an alert to respond to the security threat on the network in Block S150.

Another variation of the method S100 includes: storing elements representing a set of network events occurring at computers within a network over a period of time to a network accounting log in Block S110; compressing the network accounting log into a compressed log file representing elements of the network events occurring over the period of time in Block S120; in response to receipt of a new threat intelligence representing a security threat identified after the period of time, comparing a threat element defined in the new threat intelligence to the compressed log file in Block S130; in response to a match between the threat element and an element in the compressed log file, comparing the data in the new threat intelligence to the network accounting log in Block S140; and in response to a match between the new threat intelligence and the network accounting log, issuing an alert to respond to the security threat on the network in Block S150. The method S100 can further include, in response to a match between the new threat intelligence and the network accounting log, automatically executing a process to contain the security threat in Block S152.

2. Applications

The method can be executed in conjunction with a computer network, such as an internal network within a company, corporation, agency, administration, or other organization, to asynchronously detect security threats to the network by matching descriptors of newly-identified security threats to elements within a log of historical events that have occurred on the network over time. In particular, a system executing Blocks of the method S100 can: populate a network accounting log with events occurring on a network over time in Block S110; generate a compressed form of the network accounting log in Block S120; query the compressed log file for elements indicative of newly-identified security threats in Block S130; scan the network accounting log for elements that match features of the newly-identified security threat if the compressed log file returns a positive query result; and automatically notify a security analyst and/or automatically initiate methods to contain the security threat if a pattern characterizing the newly-identified security threat is found in the network accounting log in Blocks S140 and S152, respectively.

Generally, other detection mechanisms layered throughout the network may compare events at computers on the network for known security threats and known cyber attack indicators substantially in real-time. However, a lag of several minutes, hours, days, weeks, months, or even years may exist between a first instantiation of a new cyber attack (e.g., initial infiltration into a network) and identification of the new cyber attack. For example, an attacker may infiltrate a network unnoticed and may remain unnoticed while maintaining access into the network over an extended period of time. However, such security threats and cyber attacks may be consistently identified and characterized over time but only following attempted or successful attacks. Because new malware and other malicious software may persist within a network undetected for an extended period of time (e.g., for more than nine months), the system can implement asynchronous deep packet inspection to "look back" on historical network traffic to detect malware that may be present on a machine within the network as newly-identified security threats are identified. The system can therefore maintain a network accounting log of events occurring on a network over such an extended window of time (e.g., weeks, months, years) and can asynchronously scan this network accounting log for a security threat or cyber attack that may have previously infiltrated the network undetected as newly-identified security threats and cyber attacks are identified and characterized over time. In particular, a system executing Blocks of the method S100 can perform threat intelligence pattern discovery over a large-time-series data corpus to detect security threats that may have already compromised an asset on a network as newly-identified security threats are identified by other entities over time.

For example, the system can populate a network accounting log with a record of every event (e.g., email communication, instant message, website visited) occurring on a computer on a network over a period of time, such as in the form of network traffic, HTTP header, and/or DNS data. Upon receipt of network traffic, HTTP header, and/or DNS data representative of a newly-identified security threat, the system can scan this large-time-series data corpus for matching network traffic, HTTP header, and/or DNS data that may indicate previous infiltration of the newly-identified security into the network. The system can therefore execute Blocks of the method S100 to perform threat intelligence pattern discovery over a large-time-series data corpus to detect security threats that may have already compromised an asset on a network as newly-identified security threats are identified by other entities over time.

Furthermore, because such a network accounting log of all events occurring on a network over an extended window of time may contain a relatively large amount of data (e.g., hundreds of gigabytes or terabytes of data), the system can consolidate the network accounting log into a compressed log file of significantly smaller size (e.g., several gigabytes of data only), scan this compressed log file for elements indicative of a newly-identified security threat or new cyber attack as newly-identified security threats and cyber attacks are identified and characterized over time. The system can thus limit scans of the complete network accounting log—which may be relatively processing-intensive—if a positive match is found between a newly-identified security threat and an element contained in the compressed log file.

As newly-identified security threats are identified, the system executes Blocks of the method S100 to remotely scan a network accounting log—representing past events on the network—for indications of these previously-undetected and previously-unidentified security threats and cyber attacks that may present on the network. By "scanning the network" remotely rather than scanning each computer and other asset on the network locally, the system can identify a cyber attack already extant on the network, trigger an investigation into the cyber attack, and/or automatically quarantine compromised assets rapidly and automatically substantially without warning to an attacker.

As new network events are detected—such as over the course of a current hour or on the current date—the system tests these new network events against a corpus of threat elements of previously-known security threats to detect security threats in (near) real-time. If new threat intelligence of a newly-identified security threat is received during this period of time, the system can also test these new network events against this new threat intelligence and issue an alert substantially in real-time if a match between new or known threat intelligence and new network events are detected. Because network events represented in the existing compressed log file and the network accounting log have not yet been compared to this new threat intelligence, the system can also scan the compressed log file for network events that match the new threat intelligence, then scan the network accounting log for network events that match the new threat intelligence, and issue an alert if a sufficient match is detected. The system can also merge results of comparing these new network events and the network accounting log to the new threat intelligence to determine whether the newly-identified security threat is present on the network. The system can then insert representations of these new network events into the compressed log file and the network accounting log, both of which now represent network events that have been scanned for threat intelligence of the new and previously-known security threats. The system can repeat this process for threat intelligence of a next new threat detected by and received from an external entity. The system can therefore scan new network events for indicators of both known and newly-identified security threats and scan a corpus of past network events for indicators of newly-identified security threats only such that network events are scanned a minimum number of times (e.g., once), thereby requiring limited processing time and power by the system while also maintaining a high degree of accuracy in detection of both previously- and newly-identified security threats. (The system can additionally or alternatively interface with external intrusion detection systems and/or intrusion prevention systems that both detect network events and compare these network events to known threat intelligence to detect such known threats on the network substantially in real-time.)

Blocks of the method S100 can be executed by a remote computer system (e.g., a remote server) that remotely collects and stores network traffic data occurring on a network and compares these data to new threat intelligence on behalf of an individual, company, corporation, agency, administration, or other organization in order to asynchronously identify possible security threats and to prompt security personnel (e.g., a security analyst) to selectively investigate such possible security threats. Alternatively, Blocks of the method S100 can be executed by one or more local assets on the network or any other system.

3. Terms

The system can interface with an Information Sharing and Analysis Center ("ISAC") to access an ISAC database containing definitions for a current set of known security threats (or "threat intelligence"). Generally, an ISAC can include a central resource for gathering information on cyber threats to critical infrastructure and can support two-way sharing of threat intelligence information between private and public sectors. In particular, as newly-identified security threats and cyber attacks are identified by members of the ISAC or by external entities on behalf of the ISAC, the ISAC can add new threat intelligence pertaining to these newly-identified security threats and cyber attacks to the ISAC database. The ISAC database can then distribute updated threat intelligence to related entities, including the system. Alternatively, the system can regularly pull threat intelligence updates from the ISAC database, such as once per day.

The system can apply new threat intelligence to a network accounting log of the network to detect cyber attacks already present on a machine within the network. Threat intelligence for a particular security threat can define: an actor; tools, techniques, processes (TTPs) of the actor; and indicators of compromise (IOCs) for such an attack. Generally, TTPs can define representations of a behavior or mode of an actor. For example, threat intelligence for a particular cyber attack performed by an actor can include TTPs that specify one or more of: attack patterns; malware; exploits; kill chains; tools; infrastructure; victim targeting; malicious code; tunneling; viruses or worms; keyloggers; spyware; malicious rootkits; etc. IOCs can include forensic data, such as found in system log file entries that identify potentially malicious activity on a network. For example, threat intelligence for a particular cyber attack performed by an actor can include IOCs that specify one or more of: a virus signature; an IP address (and port and protocol); $MD_5$ hashes of malware files; URLs or domain names of botnet command and control servers; etc. IOCs for a particular cyber attack can also specify: unusual (outbound) network traffic; unusual privileged user account activity; log-in anomalies; increases in database read volume; suspicious registry or system file changes; unusual DNS requests; Web traffic showing non-human behavior; geographical irregularities; and other attack patterns that indicate possible compromise of a system or network in an instance of the particular cyber attack.

An ISAC and related entities can document IOCs of associated actors and their TTPs in a standardized format (e.g., structured threat information expression, or "STIX") to package threat intelligence for each known security threat, and the ISC can share these threat intelligence among its related entities in order to improve incident response and computer forensics.

4. Example

In one example, as new events occur over time on computers (or machines, assets) within an internal network inside a credit union, the system writes network traffic data representative of these events (e.g., netflow, HTTP header, and/or DNS data) to a network event buffer containing network traffic data spanning a limited current time window, such as the current hour, the current date, or the past twenty-four hours. The system also maintains a network accounting log of events occurring on the network over an extended duration of time (e.g., week, months, or years) in Block S110. As event data in the network event buffer falls outside of the time window of the network event buffer, the system can move these data from the network event buffer to the network accounting log. Furthermore, the system maintains a compressed version of the network accounting log (hereinafter a "compressed log file"), such as in the form of a probabilistic data structure. As new network events are transferred from the network event buffer to the network accounting log, the system also hashes elements of these new network events to the compressed log file in Block S120. Over time, the system can therefore maintain and update: a network event buffer of network events occurring over a limited duration of time; a network accounting log of network events occurring over an extended duration of time; and a compressed log file representing a compressed version of the network accounting log.

Outside of the network, a new threat is identified by or on behalf of an external entity also within a financial services sector, and the external entity generates new threat intelligence information for this new threat. In this example, the threat intelligence information: can name "Red Gang 13" as an actor for the new threat; can define TTPs that specify US credit unions as targets, that specify ransomware as a primary tool used by Red Gang 13, and that specify phishing and spear phishing as primary techniques used by Red Gang 13; and can define IOCs that indicate 88.6.14.33 as an IP address and mwindowsupdate5.com as a URL used by Red Gang 13 and that specify particular malware, hostnames, etc. used by Red Gang 13. The external entity can then share this new threat intelligence information with an ISAC, such as a financial services ISAC (or "FS-ISAC") that represents credit unions, banks, and other financial institutions, and the ISAC can distribute this new threat intelligence information to other entities within the ISAC.

Upon receipt of this new threat intelligence information for Red Gang 13, the system adds this new threat intelligence information to an existing threat corpus of threat intelligence of known threats and automatically scans the network event buffer for elements that match IOCs defined in the threat corpus. If the system detects a minimum number of elements in the network event buffer that match IOC values of a particular threat intelligence in the threat corpus or if the system matches a pattern of elements in the network event buffer to a pattern of IOC values of a particular threat intelligence in the threat corpus, such as described below, the system issues an alert for this threat.

Separately and upon receipt of this new threat intelligence information for Red Gang 13, the system automatically scans the compressed log file for common elements between the compressed log file and the new threat intelligence information in Block S130, such as for an element in the compressed log file that indicates that a computer on the network previously connected to IP address 88.6.14.33 or previously connected to mwindowsupdate5.com. If the system fails to detect a common element between the compressed log file and the new threat intelligence information, the system can determine that such an attack by Red Gang 13 has not occurred on the credit union's internal network. However, if the system finds one or more common elements between the compressed log file and the new threat intelligence in Block S130, the system can determine that an attack by Red Gang 13 on the credit union's internal network is possible, and the system can then scan the network accounting log—containing original, uncompressed network event data—for a group or cluster of event records that may confirm such an attack by Red Gang 13 on the internal network in Block S140. In particular, the system can implement pattern matching techniques in Block Size S140 to identify various elements in the network accounting log that match IOC values contained in the new threat intelligence, such as a combination of common external IP address, MAC address, hostname, URL, and event sequence or timeline between the network accounting log and the new threat intelligence.

Upon confirmation of sufficient match between various elements in the network accounting log and in the new threat intelligence, the system can execute one or more actions to handle the threat on the internal network in Block S150, such as by automatically: issuing an alert that can be combined with other alerts to trigger human involvement; prompting human security personnel at an external security operation center (or "SOC") to begin an investigation into the threat; and/or quarantining one or more compromised computers within the network.

Therefore, the system can regularly query a network event buffer of current network events for IOCs of both known and new threat intelligence defined in a threat corpus in order to determine—substantially in real-time—whether a known or new threat is present on the network. The system also moves network data from the network event buffer to the network accounting log and to the compressed log file, which represents network events that have already been scanned for IOC values of known and new threat intelligence. The compressed log file can house network event data in a probabilistic data structure that returns "possibly in set" (i.e., true or false positive) or "definitely not in set" (i.e., true negative) values when queried by the system. Therefore, when a next threat is identified and characterized by an external entity and returned to the system—which may occur hours, days, weeks, months, or even years after the threat first infiltrated a computer network—the system can: query the compressed log file for IOC values representative of this next threat; and scan the network accounting log for these IOC values only if the compressed log file query returns a positive query result. By executing this process for a next new threat, the system can rapidly predict presence of the next new threat to the network with a confidence approximating a false positive rate of the probabilistic data structure and with relatively limited resources. However, if a query for IOCs of the next new threat to the compressed log file returns a positive, the system can allocate greater resources (e.g., processing power, processing time) to checking the next new threat against the original network accounting log to confirm the threat with a greater confidence before issuing an alert to respond to the next new threat on the network.

5. Network Accounting Log

Figure 2:
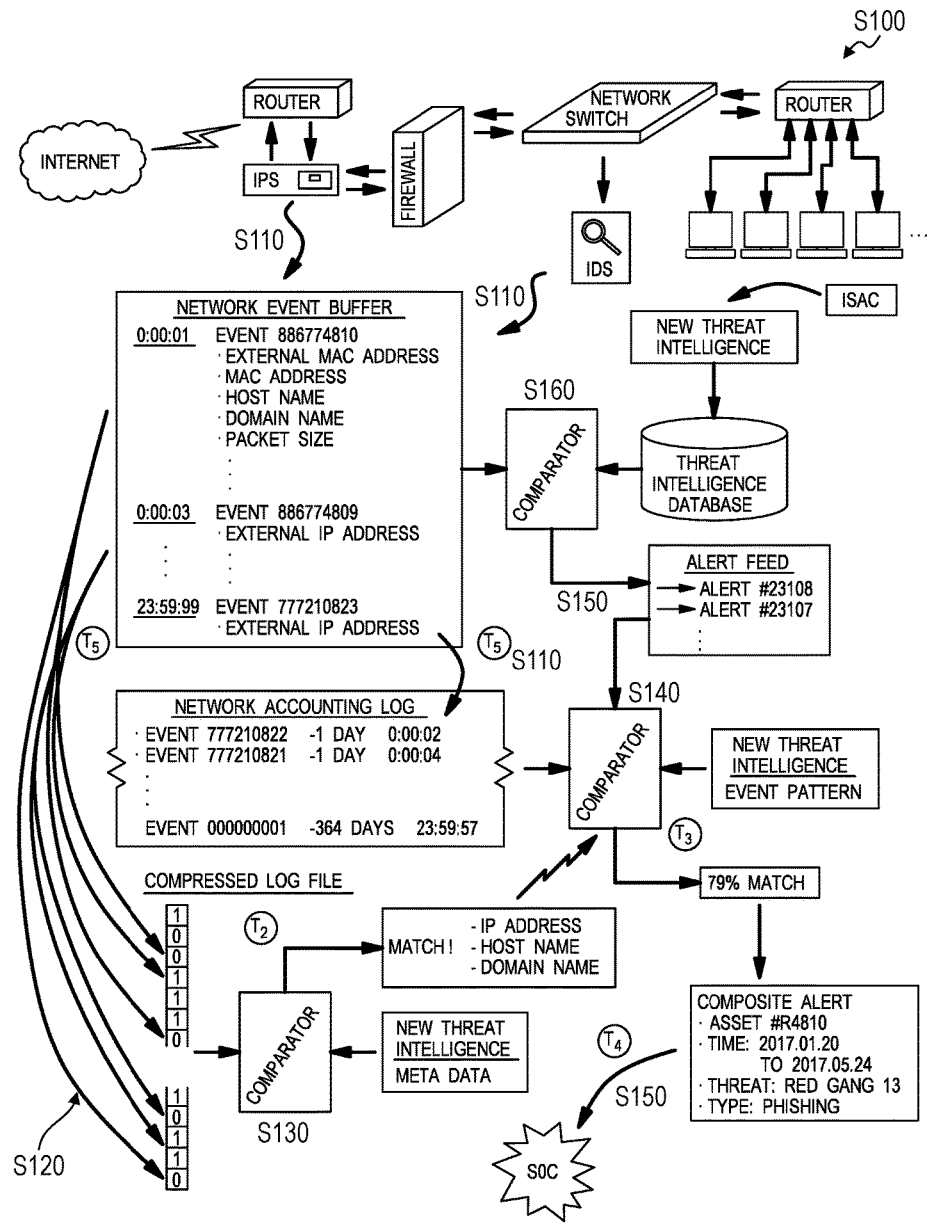
FIG. 2 is a flowchart representation of one variation of the method.

Block S110 of the method S100 recites recording representations of network events occurring on a network over a period of time to a network accounting log. Generally, in Block S110, the system populates a database of "metadata" representing network traffic occurring on a network over time. In particular, new events occurring at computers within the network may be scanned for possible security threats in real-time or in near real-time by other detection mechanisms—such as external intrusion detection systems (IDS) or intrusion prevention systems (IPS), as shown in FIG. 2—layered throughout the network. Such detection systems may compare a new event to threat intelligence of security threats known at the time of the event to determine in real-time if the event may be an indicator of an attack on the network. The system (or the IDSs or IPSs) can additionally or alternatively implement deep packet inspection techniques to detect events occurring on the network; the system can then implement Block S160 described below to associate these events with a security threat—in a corpus of known threats—and to respond to this security threat substantially in real-time.

However, a security threat may not be known or identified at the time a new network event related to the security threat occurs. In Block 110, the system can therefore store representations of each new event on the network in a network accounting log for later comparison with threat intelligence of a newly-identified security threat once the newly-identified security threat is identified and characterized at a later time in order to determine whether these new events indicate that this newly-identified security threat is present on the network.

In one implementation, the system records network traffic, HTTP header, and/or DNS data for all intra-network and inter-network traffic (hereinafter "events") occurring at (substantially) all machines within the network over a period of time (e.g., twelve months) to a network accounting log. For example, the system can populate the network accounting log with available network traffic, HTTP header, and DNS data for (substantially) every communication (e.g., email, instant message, and data packet) sent and received by a computer on the network and every website visited by the computer during the window of time. In this example, the system can store: all connections between two computers and their connected ports at a network level; IP and MAC address pairs; an amount of exchanged data and/or an event timestamp as network traffic data in the network accounting log; etc. such as collected by IDSs and/or IPSs implementing deep packet inspection techniques to extract these values from data (and headers) passing through inspection points throughout the network. The system can also write a website URL, a hostname, and a browser identifier from HTTP header data of these network events to the network accounting log. Similarly, the system can write domain names of a DNS—as available—for data packets inbound to and outbound from computers on the network to the network accounting log.

The system can collect these event metadata via port mirroring on core switches within the network, by extracting flow information from switches and routers, or in any other way and can write event metadata of any other type to the network accounting log, such as stored locally on the network or remotely. However, the system can collect and store event metadata in any other way and in any other format in a network account log.

In Block S110, the system can inject network traffic data into a perpetual network accounting log that spans an unlimited duration. Alternatively, the system can inject network traffic data into a limited network accounting log that spans a limited duration, such as one year up to a current time, as shown in FIGS. 1 and 2. In this implementation, the duration of the network accounting log can correspond to (e.g., be 120% of) a common maximum or average duration of time from first infiltration of a new cyber attack on any network to first identification of this new cyber attack as a security threat such that the network accounting log contains sufficient historical data to enable the system to asynchronously detect the new cyber attack on the network by scanning the network accounting log days, weeks, months, or even years after the new cyber attack may have first infiltrated the network but immediately upon first identification of this new cyber attack. In this implementation, the system can thus remove (i.e., delete, discard) data—exceeding the assigned duration of the network accounting log—from the network accounting log over time. Alternatively, the system can generate and maintain multiple discrete (i.e., non-overlapping, disjointed) network accounting logs, such as including: a short-term network accounting log containing network event data from a past week; a mid-term network accounting log spanning one week prior to one quarter prior; a long-term network accounting log spanning one quarter prior to one year prior; and a perpetual network accounting log containing a complete network event history terminating one year prior to a current date. The system can thus shift data from the short-term network account log to the mid-term network account log then to the long-term network account log and then to the perpetual network account log over time as new network events are detected and recorded to the short-term network account log over time.

However, the system can generate and maintain any other number of network accounting logs spanning any other duration(s) of time.

6. Compressed Log File

Block S120 of the method S100 recites writing metadata values of network events in the accounting log to a compressed log file. Generally, in Block S120, the system can compress the network accounting log into a space-efficient probabilistic data structure that can be rapidly queried in Block S130 with a value representing a newly-identified (or "new") security threat to ascertain—with some known false positive error rate—whether the network accounting log contains event metadata that may indicate a corresponding cyber attack on the network. In particular, in Block S120, the system can write metadata (IP address, URL or domain name, and hostname) of network events represented in the network accounting log to a probabilistic data structure.

In one implementation, the system generates a Bloom filter from data contained in the network accounting log. In this implementation, the system can generate an empty Bloom filter containing a bit array of m bits—all set to null—proportional to: a time window represented by the network accounting log (e.g., one year); a number of assets currently on the network and a number of additional assets projected to be on the network in the future (e.g., within the next year); a frequency of network events occurring on the network (e.g., based on types and numbers of assets on the network); and/or a number of event metadata types (e.g., "3," including external IP addresses, hostnames, and URLs) in the network accounting log to be represented in the compressed log file. The system can also define a k-number of different hash functions—based on a target false positive rate (e.g., <1%)—to map elements from the network accounting log to the bit array.

To store an event in the compressed log file, the system can feed event metadata (e.g., an external IP address, a hostname, or a URL) of this event from the network accounting log to each of the k hash functions to calculate k array positions for this element and then set bits at each of these positions to 1 in order. In Block S130, the system can thus query the compressed log file for a threat element—such as defined in an IOC and representing a newly-identified security threat—by feeding the threat element to each of the k hash functions to get k array positions; the system can thus confirm that the threat element is not in the network accounting log if any bits at these k array positions are null, and the system can confirm (possible) presence of the threat element in the network accounting log if all bits at these k array positions are set to "1." The system can then execute Block S140 to perform a deeper search for threat elements within the network accounting log that may confirm existence of a corresponding cyber security attack on the network.

In the foregoing implementation, the system can generate a single general Bloom filter representing all external IP addresses, URLs (or domain names), and external hostnames (or any other combination of event metadata) contained in the network accounting log in Block S120. Upon receipt of threat intelligence defining IOCs of a newly-identified security threat or cyber attack (or "threat elements"), the system can sequentially query the general Bloom filter for threat elements of these same types— including external IP addresses, domain names, and hostnames—defined in the threat intelligence in Block S130.

Alternatively, the system can generate: an IP-address-specific Bloom filter representing all external IP addresses contained in the network accounting log; a separate URL-specific Bloom filter representing all URLs contained in the network accounting log; and a separate hostname-specific Bloom filter representing all external hostnames contained in the network accounting log. For example, the system can extract external IP addresses, domain names, and hostnames from the network accounting log and then: write external Internet Protocol addresses associated with these network events to a first probabilistic data structure; write domain names associated with these network events to a second probabilistic data structure; and write hostnames associated with network events to a third probabilistic data structure in Block S120. Upon receipt of new threat intelligence for a newly-identified security threat, the system can sequentially query the set of Bloom filters with threat elements of corresponding types defined in the new threat intelligence until a match is found or until all queries for the threat elements are completed. In the foregoing example, upon receipt of a new threat intelligence, the system can: query the first probabilistic data structure for an external Internet Protocol address defined by the new threat intelligence; separately query the second probabilistic data structure for a domain name defined by the new threat intelligence; and separately query the third probabilistic data structure for an hostname defined by the new threat intelligence in Block S130.

Alternatively, the system can generate a cuckoo filter or other space-efficient probabilistic data structure representing elements contained in the network accounting log, which can then be searched relatively rapidly in Block S130 to determine if the network accounting log includes elements that may indicate infiltration into the network by the newly-identified security threat or cyber attack. Yet alternatively, in Block S120, the system can implement a hash function to map metadata—of various types and lengths—of network events stored in the network accounting log to a hash table, thereby compressing multiple instances of identical metadata (e.g., identical external IP addresses, domain names, and hostnames) for multiple discrete network events stored in the network account log into one table value. The system can then query the hash table for an element defined by the new threat intelligence in Block S130.

However, the system can generate any other number of compressed log files (e.g., Bloom filters or other probabilistic data structures) containing elements of any other one or more type(s) represented in the network accounting log.

7. Log Updates

As new events occur at computers on the network, the system appends the network accounting log with a record of this new event and inserts elements of this new event into the compressed log, as described above. However, the system can define a window of time that bounds a maximum age of events represented in the network accounting log and the compressed log, such as to limit a maximum file size of the network accounting log. For example, the system can define a static one-year window for the network accounting log and the compressed log. Alternatively, the system can dynamically adjust this time window based on new information for common durations of time from first instantiation of a new cyber attack at a computer or computer network (e.g., initial infiltration into a network) to detection of the new cyber attack and representation of the new cyber attack in an ISAC. For example, the system can set the time window at 120% of the maximum time from initial instantiation to discovery and characterization of a known cyber attack represented in the ISAC. Alternatively, this time window can be manually set, such as by a security analyst or other security personnel through a security portal hosted by the system.

In one implementation, the system intermittently removes expired event records (i.e., records of past events occurring beyond the time window defined by the system) and corresponding elements from the network accounting log and compressed log file. In one example in which the compressed log file includes a Bloom filter, the system removes (i.e., deletes) event records exceeding a threshold age of twelve months from the network accounting log at the end of each month of operation. The system can thus maintain a network accounting log of events spanning the past twelve to thirteen months. In this example, upon removing representations of events older than thirteen months from the network accounting log, the system can regenerate a Bloom filter from events remaining in the updated network accounting log such that the compressed log file represents the same duration of time as the network accounting log.

In the foregoing implementation, the system can generate an empty Bloom filter containing a bit array of m bits—all set to null—of size based on the time window assigned to the network accounting log (e.g., one year), a predicted frequency of events on the network, and a preset maximum false positive rate (e.g., 1%). The system then: writes network event data to the network accounting log substantially in real-time; injects metadata of these events from the network accounting log into the Bloom filter in Block S120; and/or maintains a counter of a number of values inserted into the Bloom filter. As the number of values inserted into the Bloom filter increases, the false positive rate of query results of the Bloom filter similarly increases. Therefore, the system regenerates the Bloom filter in response to a value of the counter exceeding a precalculated value corresponding to a false positive rate that exceeds the preset maximum false positive rate. Alternatively, the system can calculate the false positive rate of the Bloom filter directly based on the counter and other parameters of the Bloom filter and then regenerate the Bloom filter when the calculated false positive rate exceeds the preset maximum false positive rate. To regenerate the Bloom filter, the system can: truncate oldest network events in the network accounting log, such as an oldest month of network events; generate an empty Bloom filter containing a bit array of the same length; inject metadata of events remaining in the network accounting log into the Bloom filter; and inject metadata of new events occurring on the network over the next month into the Bloom filter in Block S120. The system can implement similar methods and techniques to generate and maintain Bloom filters (or other probabilistic data structures) spanning other time windows, such as one Bloom filter per short-term, mid-term, long-term, and extended network accounting log described above.

The system can additionally or alternatively can generate a counting filter that discards positive matches for elements in the compressed log that correspond to expired event records in the network accounting log.

However, the system can implement any other method or technique to handle expired event records in the network accounting log and in the compressed log.

8. Initial Threat Detection

Block S130 of the method S100 recites, in response to receipt of a new threat intelligence representing a newly-identified security threat identified after the period of time, querying the compressed log file for a set of metadata values of a threat element defined in the new threat intelligence. Generally, once threat intelligence for a newly-identified security threat is received, such as from an ISAC, the system queries the compressed log for one or more threat elements defined in the threat intelligence (e.g., in an IOC) in Block S130; if such a match between an element in the compressed log and a threat element defined in the threat intelligence is found, the system can implement deep packet inspection techniques in Block S140 to further confirm or refute a possible cyber attack on the network—detected initially in Block S130—based on original data contained in the network accounting log, as shown in FIGS. 1 and 2. In particular, Because the compressed log file contains a limited amount of data of limited types in a probabilistic data structure that outputs query results limited to the equivalents of "definitely not in the set" and "possibly in the set" and is structured to prevent false negatives, the system can query the compressed log file for a network traffic metadata value characteristic of a threat element defined in new threat intelligence of a newly-identified security threat to rapidly confirm that the network has not been exposed to this threat element in the past. The system can also rapidly detect—with a degree of confidence related to the false positive rate of the compressed log file—possible exposure of the network to the newly-identified security threat responsive to a positive query result from the compressed log file in Block S130. Once the system detects possible exposure of the network to the newly-identified security threat in Block S130, the system can execute deeper inspection into the network accounting log to identify events and patterns of events indicative of the presence of the newly-identified security threat on the network in Block S140, thereby allocating resources for detection of a newly-identified security threat proportional to a degree of confidence that the newly-identified security threat is present on the network.

In one implementation in which the system compresses the network accounting log into one Bloom filter, the system extracts an IP address from a threat element (e.g., an IOC) defined by a newly-identified security threat and queries the Bloom filter for this IP address. If the Bloom filter returns a positive query result for this IP address, the system can then execute Block Size 140 to confirm presence of the IP address and various other threat elements for the newly-identified security threat in the network accounting log, which may indicate presence of such a cyber attack on the network. However, if the Bloom filter does not return a positive query result for this IP address, the system can then extract a URL from the threat element of the newly-identified security threat and query the Bloom filter for this URL. If the Bloom filter returns a positive query result for this URL, the system can then execute Block S140. However, if the Bloom filter does not return a positive query result for this URL, the system can extract a hostname from the threat element of the newly-identified security threat and query the Bloom filter for this hostname. If the Bloom filter returns a positive query result for this hostname, the system can then execute Block S140. Furthermore, because the Bloom filter is configured to return no false negatives, the system can determine that the newly-identified security threat has not previously been the source of a cyber attack on the network if the Bloom filter does not return a positive query result for any of the IP address, the URL, or the hostname of this threat element of the newly-identified security threat.

In the foregoing implementation, because the newly-identified security threat may define multiple threat elements, the system can repeat this process for each of multiple threat elements, such as external IP addresses defined by all of these threat elements, then URLs (or domain names), and then hostnames defined by all of these threat elements. To reject false positive query results, the system can also execute Block S140 only if the compressed log file returns positive query results for multiple query terms, such as positive query results for multiple metadata values for a single threat element in the new threat intelligence or positive query results for one or more distinct metadata values for multiple threat elements in the new threat intelligence.

Alternatively, in the implementation described above in which the system generates multiple compressed log files, such as one compressed log file for each of different metadata types of network event metadata, the system can separately query these compressed log files for metadata values from one or multiple threat elements representative of the newly-identified security threat. For example, in Block S130, the system can: query a first probabilistic data structure for an external Internet Protocol address of a threat element defined by the new threat intelligence; query a second probabilistic data structure for a domain name of the threat element; query a third probabilistic data structure for a hostname of the threat element; and then merge query results returned by these probabilistic data structure to predict exposure of the network to this threat element. In this example, if none of the first, second, or third probabilistic data structures return positive query results, the system can determine that the network has not been exposed to this threat element in the past. Similarly, if only a subset (e.g., one or two) of the first, second, and third probabilistic data structures return positive query results, the system can associate these positive query results with false positives and determine that the network has not been exposed to this threat element in the past accordingly. However, if a greater subset (e.g., all) of the first, second, and third probabilistic data structures return positive query results, the system can determine that the network has been exposed to this threat element in the past and then trigger deeper inspection of the network accounting log to confirm or predict presence of the security threat on the network.

However, the system can query the compressed log for metadata values of any other types and of any other number of threat elements in Block S130. The system can then trigger deeper inspection into the network accounting log to detect indicators of a cyber attack on the network in Block S140 if the compressed log file(s) returns a threshold number of positive query results for threat elements defined in the new threat intelligence in Block S130.

Furthermore, in the variation described above in which the system generates and maintains multiple discrete (i.e., non-overlapping, disjointed in time) network accounting logs and/or multiple discrete compressed log files, the system can implement the foregoing methods and techniques to query a first compressed log file corresponding to a most-recent period of time in Block S130. If the first compressed log file returns at least a threshold number of positive query results, the system can transition to executing Block S140. However, if the first compressed log file returns a negative query result (e.g., in response to omission of a queried threat element from the compressed log file) or in response to fewer than the threshold number of positive query results, the system can then implement similar methods and techniques to query a second compressed log file corresponding to a preceding period of time in Block S130; and repeat the foregoing process until the set of discrete compressed log files is exhausted or until the threshold number of positive query results is returned by one or across multiple compressed log files.

However, the system can selectively query one or multiple compressed log files—representing network events occurring over various periods of time—according to any other schema.

9. Threat Detection Confirmation

Figure 3:
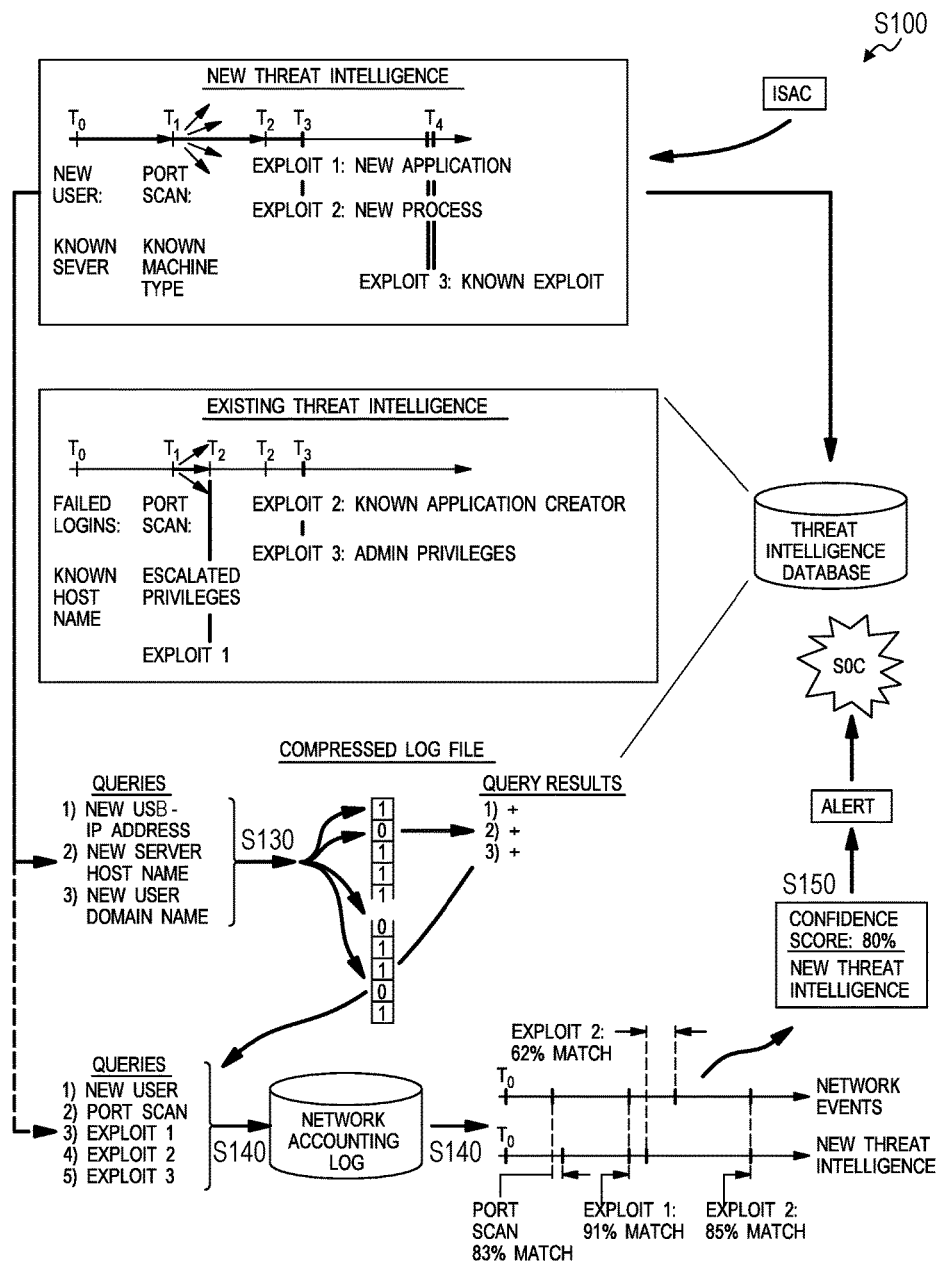
FIG. 3 is a flowchart representation of one variation of the method.

Block S140 of the method S100 recites, in response to detecting the threat element in the compressed log file, querying the network accounting log for the threat element. Generally, in Block S140, the system scans the network accounting log for structured and unstructured data that may indicate exposure of the network—within a time window represented by the network accounting log—to a new cyber attack characterized in new threat intelligence. In particular, the system can scan the compressed log for metadata of threat elements defined in the new threat intelligence for a newly-discovered security threat in Block S130 once this new threat intelligence is received; the system can then scan the network accounting log—which may be of much greater size and resolution than the compressed log and therefore require more time and greater processing power to scan than the compressed log—only upon receipt of a sufficient number of query results for metadata of threat elements of the new threat intelligence from the compressed log file, as shown in FIGS. 1, 2, and 3. The system can then execute an action—such as issuing an alert, prompting security personnel to investigate an attack, or automatically quarantining assets on the network—in Blocks S150 and S152 once a sufficient number of threat elements and/or a pattern of threat elements defined in the new threat intelligence are detected in the network accounting log.

In one implementation, once a possible security threat to the network is identified from the compressed log in Block S130, the system scans the network accounting log for matches to various network traffic, HTTP header, and DNS data defined in threat elements (e.g., IOCs) representative of the newly-identified security threat in Block S140. For example, the system can implement string-matching techniques to match: a network level port connection, an IP address, a MAC address, a website URL, a hostname, a browser identifier, a domain name, and/or other structured and unstructured data defined by threat elements in the new threat intelligence; to network events recorded in the network accounting log. In this example, the system can calculate a similarity score between a network event represented in the network accounting log and a threat element defined by the new threat intelligence based on a number of discrete datums contained in the threat element (e.g., network level port connection, an IP address, a MAC address, a website URL, a hostname, a browser identifier, and other packet data) that are identical and/or similar to datums contained in the network event. Alternatively, the system can thus detect binary matches between network events represented in the network accounting log and threat elements defined in the new threat intelligence.

The system can then aggregate matches between network events and threat elements to predict exposure of the network to the newly-identified security threat in Block S140. For example, the system can calculate a linear combination of similarity scores between these network events and threat elements; this linear combination can represent a confidence score for exposure of the network to the newly-identified security threat.

The system can additionally or alternatively implement pattern-matching techniques to calculate a degree of temporal alignment between singular network events in the network accounting log and threat elements defined in the new threat intelligence that may suggest presence of the newly-identified security threat on the network now or in the past. In one example, threat intelligence for a newly-identified security threat defines an attack pattern, including a relative timeline of one or more initial infiltration, command and control, reconnaissance, and lateral movement stages of a cyber attack. In this example, once network elements in the network accounting log are matched to threat elements defined in the new threat intelligence, the system can calculate a degree of temporal alignment between timestamps of these network events and an order of threat elements defined in the new threat intelligence. The system can then merge this degree of temporal alignment and similarity scores between these network events and threat elements into a confidence score that represents a degree to which network events stored in the network accounting log match a cyber attack pattern characteristic of the newly-identified security threat.

In particular, the newly-identified security threat can be characterized by a sequence of actions of various types to initially infiltrate a network, gain command and control of a particular asset on the network, execute reconnaissance of assets and data on the network, and/or move laterally to other assets on the network; and the order of and/or times between these actions may be characteristic of the newly-identified security threat, as shown in FIG. 3. Therefore, the system can calculate a strength of correlation between an order and/or timing of network events—matched to threat elements in the new threat intelligence—and the order and/or timing of actions (e.g., threat elements) characteristic of the newly-identified security threat. In one example shown in FIG. 3, the new threat intelligence includes a cyber attack model of the newly-identified security threat; and the system can pass the cyber attack model and timestamped network events—matched to threat elements in the new threat intelligence—into an artificial neural network to calculate a strength of temporal alignment between the cyber attack model and these network events (e.g., a "confidence score"). By not only matching network events in the network accounting log to threat elements in the new threat intelligence but also matching order and/or timing of these data, the system can calculate a high-resolution confidence score for exposure of the network to the newly-identified security threat in Block S140 and selectively output alerts in Block S150 accordingly.

In the foregoing implementation, the system can query the network accounting log for a set of network events resembling (e.g., approximating) threat elements defined in the new threat intelligence in response to receiving a positive query result from the compressed log file in Block S130; predict exposure of the network to the security threat based on temporal alignment between a sequence and a timing of the set of network events in the network accounting log and a cyber attack pattern defined in the new threat intelligence; calculate a confidence score for presence of the security threat on the network proportional to this degree of temporal alignment in Block S140; and then issue an alert in response to this confidence score exceeding a preset threshold value in Block S150.

Therefore, in Block S140 the system can: calculate a confidence score for presence of the newly-identified security threat on the network based on: a number of threat elements defined in the new threat intelligence to matched network events stored in the network accounting log; a strength of alignment of these threat elements in the new threat intelligence to matched network events (e.g., proportional to matched metadata and content values); and temporal alignment between a relative timeline of threat elements defined in the new threat intelligence and timestamps of matched network events stored in the network accounting log, as shown in FIG. 3. Thus, if this confidence score exceeds a preset threshold value, the system can: predict that the network has been exposed to the newly-identified security threat at some time during the time window represented by the network accounting log; and then issue an alert accordingly in Block S150.

However, the system can implement any other methods or techniques to match elements contained in the network accounting log to elements defined in threat intelligence for the newly-identified security threat. The system can also estimate a stage of this cyber attack on the network—such as initial infiltration, command and control, reconnaissance, or lateral movement stages—based on which threat elements of the cyber attack pattern defined in the new threat intelligence have been matched (e.g., to a sufficient degree of similarity) to network events in the network accounting log. For example, the threat intelligence can define a group of network events, each of which is associated with a particular stage of the new cyber attack; based on which of these groups contain threat elements matched to network events in the network accounting log, the system can determine the stage of the new cyber attack on the network. The system can incorporate a flag or indicator of this stage in an alert generated in Block S150. The system can also selectively prompt manual investigation into possible exposure to the newly-identified security threat at the network or automatically quarantine assets on the network based on the estimated stage of the cyber attack.

Furthermore, if the system does not detect alignment between network events stored in the network accounting log and threat elements defined in the new threat intelligence, determines low or limited temporal alignment between these network events and threat elements is low, and/or calculates a confidence score less than the threshold value for exposure to the newly-identified security threat, the system can determine that the newly-identified security threat has not penetrated the network or that insufficient data exists to prompt investigation into such a cyber attack on the network. Accordingly, the system can reject a previous prediction of exposure of the network to the newly-identified security threat.

Alternatively, if the confidence score calculated by the system for the newly-identified security threat is greater than the threshold value (e.g., a low score of 0.1 or 10%), the system can generate an alert specifying the newly-identified security threat, assets on the network that may be involved or exposed to the newly-identified security threat, and the confidence score. Later, the system or other computer system connected to the network can merge this alert with other alerts, behaviors, and/or signals generated or detected on the network to predict exposure to the same or other security threat to a greater degree of confidence sufficient to trigger a manual investigation, as described below.

10. Actions

Block S150 recites, in response to detecting the set of threat elements in the network accounting log, issuing an alert to respond to the security threat on the network. Generally, in Block S150, the system triggers an alert to investigate possible exposure to the newly-identified security threat when sufficient alignment between network events in the network accounting log and threat elements defined by the new threat intelligence is detected. For example, the system can execute Block S150 when a calculated temporal alignment between a set of network events—exhibiting quantitative similarities to threat elements representative of the newly-identified security threat—yields a confidence score for risk to the network that exceeds a preset threshold value.

In one implementation, the system issues an alert in Block S150 if the confidence score for exposure to the newly-identified security threat is greater than a threshold value (e.g., a low score of 0.1 or 10%). The system can later: combine this alert with other alerts—such as generated by IDSs and IPSs on the network—to form a composite alert; calculate a risk score for the composite alert; and prompt human security personnel (e.g., a security analyst) at a security operation center (or "SOC") to investigate a possible cyber attack on the network only once the calculated risk score for the composite alert exceeds a threshold risk score.

Alternatively, the system can push an alert directly to human security personnel in Block S150 following confirmation of a possible cyber attack on the network on Block S140. For example, if the confidence score for risk of the newly-identified security threat to the network exceeds a preset threshold value (e.g., if the confidence score falls within a range of values for triggering manual investigation, such as between 40% and 80%), the system can generate an alert that includes: details of the possible cyber attack that has matched to network events in the network accounting log, such as including a name, attack category, common attack duration, attack pathways, and/or an estimated current stage of the cyber attack; and a prompt to begin an investigation into presence or exposure of this newly-identified security threat on the network. In particular, the system can detect a network event—originating at or involving a particular asset on the network—in the network accounting log that matches or exhibits high similarity to a threat element (e.g., an indicator of compromise) defined in the new threat intelligence in Block S140; and then generate an alert indicating the newly-identified security threat, indicating the particular asset, and containing a prompt to investigate the network for presence of the newly-identified security threat in Block S150.

The system can also estimate a duration over which the network has been exposed to the newly-identified security threat based on timestamps of network events matched to threat elements defined in the new threat intelligence, such as including: a time and date of first attempted infiltration into the network; a time and date of first successful infiltration into the network; a time and date of last threat-related activity on the network; and/or times and dates of other threat-related actions executed or attempted on the network. The system can then insert these temporal data and related tags into the alert in Block S150. However, the system can insert any other relevant data or content into the alert in Block S150.

The system can then: insert the alert into an email, SMS text message, or notification for a native security application, etc.; and push this alert to one or more human security personnel via their desktop computers, mobile devices, web portals, or other devices in Block S150. The system can additionally or alternatively push the alert to an alert feed or master alert feed in a SOC in Block S150. However, the system can communicate an alert and related data to an alert feed, to security personnel, to a security analyst, and/or to a SOC, etc. in any other way in Block S150.

One variation of the method S100 further includes Block S152, which recites, in response to an alignment between threat elements defined in the new threat intelligence and network elements stored in the network accounting log, automatically executing a process to contain the security threat. Generally, in Block S152, the system can automatically execute a script or other process to automatically respond to a possible security threat identified in Block S130 and confirmed in Block S140. For example, the system can automatically terminate a process, quarantine files, delete registry keys, take a compromised computer off the network, shift a compromised computer to a quarantine network, initiate a third-party investigation, and/or execute any other script or function in Block S152 to automatically respond to possible exposure of the network to the newly-identified security threat.

In one implementation, if the confidence score for risk of the newly-identified security threat to the network exceeds a preset quarantine score (e.g., if the confidence score exceeds a range of values for triggering a manual investigation, such as 80%), the system can automatically execute a process to quarantine the asset—originating or involving threat elements defined by the new threat intelligence—from the network in order to contain the newly-identified security threat. In this implementation, the system can match network events to threat elements associated with particular stages of the cyber attack and can selectively execute automated processes to contain this security threat at assets on the network associated with these network events based on stages of matched threat elements. For example, the system can automatically: remove a first asset that executed a network event matched to a command-and-control-type threat element from the network; quarantine a second asset that executed a network event matched to a reconnaissance-type threat element; and delete registry keys from a third asset that executed a network event matched to a lateral-movement-type threat element.

Similarly, the system can execute attack-type specific processes based on threat intelligence for a confirmed cyber attack type. For example, the system can automatically execute a quarantine script to remove all compromised assets from the network for a malicious data mining attack detected and/or confirmed in Block S140. In another example, the system can automatically execute an observation script to track and record both intra-network and inter-network events occurring at compromised computers for an advanced persistent threat detected and/or confirmed in Block S140. In another example, following detecting and/or confirming a cyber attack on the network in Block S140, the system can execute: a script to scan computers on the network for evidence of lateral movement by the cyber attack following initial infiltration into the computer; and a script to determine if any data was leaked out of the network during the cyber attack and what data, when, and to what degree of sensitivity such data was leaked.

However, the system can automatically execute any other predefined action, process, or routine in Block S152 in response to predicting, detecting, and/or confirming a cyber attack on the network and/or in response to calculating a composite risk score that exceeds a threshold risk score.

Furthermore, the system can repeat this process over time. For example, the system can: querying the compressed log file for a second threat element defined in a second threat intelligence in response to receipt of the second threat intelligence representing a second security threat identified on a subsequent date; querying the network accounting log for the second threat element in response to receiving a positive query result from the compressed log file; and then issue a second alert to respond to the second security threat on the network in response to detecting the second threat element in the network accounting log. The system can also implement a similar process to test the compressed log file and, when relevant, the network accounting log in response to receipt of new threat intelligence for multiple newly-identified security threats, such as simultaneously or during the same time window (e.g., on the same date), as shown in FIG. 1.

11. Real-Time Threat Detection

In one variation shown in FIG. 2, the system scans new network events for threat elements (e.g., IOCs) defined in the new threat intelligence substantially in real-time in Block S160 and generates alerts for possible exposure to the newly-identified security threat in response to detected similarities between these new network events and these new threat elements.

In one implementation, the system interfaces with IDSs and/or IPSs on the network to detect network events indicative of IOCs of known security threats substantially in real-time. In this implementation, the system can maintain a threat intelligence database of known security threats—including threat intelligence defining threat elements characteristic of these known security threats—and can append this threat intelligence database with new threat intelligence as new threat intelligence becomes available, such as from an ISAC, as described above. The system can serve the threat intelligence database (or data contained therein) to IDSs and/or IPSs throughout the network to assist these IDSs and/or IPSs in detecting IOCs on the network in real-time. (Alternatively, the IDSs and/or IPSs can access these threat intelligence from an external entity.) For example, the IDSs and/or IPSs can output micro alerts defining correlations between new network events and threat elements defined by threat intelligence in the threat intelligence database. When new threat intelligence for a newly-identified security threat is received, the system can also scan the compressed log file in Block S130 and, when relevant, the network accounting log for past network events indicative of this newly-identified security threat in Block S140, as described above, such as before new network events detected by the IDSs and/or IPSs are written to the compress log file and to the network accounting log. Thus, the IDSs and/or IPSs can scan new network events for IOCs of (substantially) all known past and newly-identified security threats as these new network events are detected, and the system can scan past network events for IOCs of newly-identified security threats only since these past network events were previously scanned by the IDS and/or IPSs for IOCs of past security threats when these past security threats were new.

Furthermore, if the IDSs and/or IPSs detect correlations between new network events and threat elements of a newly-identified security threat, the system can merge micro alerts output by the IDSs and/or IPSs with matches between values in the compressed log file and metadata of threat elements in the new threat intelligence to trigger deeper investigation into the IOCs of the newly-identified security threat in the network accounting log. Similarly, if the IDSs and/or IPSs detect correlations between new network events and threat elements of a newly-identified security threat, the system can merge micro alerts output by the IDSs and/or IPSs with correlations (e.g., matches, temporal pattern matches) between network events in the network accounting log and threat elements in the new threat intelligence in order to calculate a confidence score for exposure to the newly-identified security threat based on both new and past network events. For example, the system can implement pattern matching techniques to calculate a degree of temporal alignment between: both new network events recently detected by the IDSs and/or ISPs and past network events stored in the network accounting log; and threat elements defined by the new threat intelligence. The system can then calculate a confidence score for risk of the newly-identified security threat to the network in Block S140 and output an alert accordingly in Block S150.

In another implementation, the system records representations of a new set of network events occurring during a current time block (e.g., the current hour, current date, etc.) to a network event buffer. As new network events are detected within the current time block, the system implements methods and techniques described above to scan these network events for IOCs of known and newly-identified security threats. For example, the system can: maintain a threat intelligence database of known security threats and can append this threat intelligence database with new threat intelligence as new threat intelligence becomes available, as described above; and compare threat elements in the threat intelligence database to network events stored in the network event buffer to detect IOCs of known security threats substantially in real-time. However, the threat intelligence database may contain a corpus of elements significantly greater than the size of the network event buffer. Therefore, to reduce total time to test network events in the network event buffer against the threat intelligence database, the system can: compress the threat intelligence database, such as by generating a Bloom filter and inserting metadata of threat identifiers in the threat intelligence database into this Bloom filter to generate a compressed threat file. As new network events are detected, the system can query the compressed threat file for metadata of new network events (e.g., external IP addresses, hostnames, and domain names); pending return of a sufficient number of positive query results for a new network event, the system can query the threat intelligence database directly for more complete confirmation that the new network event represents an IOC of a known security threat. Therefore, for short-term, (near) real-time detection of IOCs of known (i.e., past and new) security threats occurring on the network, the system can implement (inverted) methods and techniques described above to compress the threat intelligence database (e.g., into a Bloom filter) and to query this compressed threat file for metadata of new network events.

If new threat intelligence of a newly-identified security threat was recently added to the threat intelligence database, the system can scan the compressed log file and, if relevant, the network accounting log for IOCs of this newly-identified security threat, as described above, prior to moving new network events in the network event buffer to the network accounting log and prior to updating the compressed log file with metadata values of these new network events. For example, and as described above, the network event buffer can be configured to store one hour or one day of network events (i.e., spanning significantly less duration than the network accounting log); the system can scan the network event buffer for IOCs of known security threats before moving these data into the network accounting log and clearing the network event buffer in preparation for a next time window. Alternatively, the network event buffer can define a rolling buffer, and the system can systematically roll network events from the network event buffer into the network accounting buffer.

As described above, the system can issue alerts substantially in real-time in response to detecting IOCs—defined in the threat intelligence database—in new network events. If these IOCs correspond to a newly-identified security threat that has not yet been tested against the network accounting log, the system can: implement methods and techniques described above to scan the compressed log file for metadata of threat elements defined in the new threat identifier in Block S140; selectively scan the network accounting log for network events exhibiting similarity to these threat elements; calculate a confidence score exposure of the network to the newly-identified security threat based on correlation between the newly-identified security threat and network events in both the network accounting log and the network event buffer; and then issue an alert accordingly in Block S150, as shown in FIG. 2.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for detecting a cyber attack comprising:
storing network traffic data of network events occurring on a network over a period of time to a network accounting log;
compressing the network accounting log by writing metadata of network events, occurring within the period of time and represented in the network accounting log, to a compressed log file comprising a probabilistic data structure;
in response to receipt of a new threat intelligence representing a newly-identified security threat identified after the period of time, querying the compressed log file for a network traffic metadata value representative of a threat element defined in the new threat intelligence;
in response to detecting the threat element in the compressed log file, querying the network accounting log for the threat element; and
in response to detecting the threat element in the network accounting log, issuing an alert to respond to the newly-identified security threat on the network.

2. The method of claim 1:
wherein compressing the network accounting log into the compressed log file comprises:
writing external Internet Protocol addresses associated with network events represented in the network accounting log to the probabilistic data structure;
writing domain names associated with network events represented in the network accounting log to a second probabilistic data structure; and
writing hostnames associated with network events represented in the network accounting log to a third probabilistic data structure;
wherein querying the compressed log file for the value representative of the threat element comprises:
querying the probabilistic data structure for an external Internet Protocol address defined by the new threat intelligence;
querying the second probabilistic data structure for a domain name defined by the new threat intelligence; and
querying the third probabilistic data structure for a hostname defined by the new threat intelligence; and
wherein querying the network accounting log for the threat element comprises querying the network accounting log for a pattern of network events defined by the new threat intelligence in response to receiving positive query results from the first probabilistic data structure, the second probabilistic data structure, and the third probabilistic data structure.

3. The method of claim 1:
wherein compressing the network accounting log into the compressed log file comprises writing external Internet Protocol addresses, domain names, and hostnames of network events represented in the network accounting log to the probabilistic data structure;
wherein querying the compressed log file for the value representative of the threat element comprises querying the probabilistic data structure for an external Internet Protocol address, a domain name, and a hostname defined by the new threat intelligence; and
wherein querying the network accounting log for the threat element comprises querying the network accounting log for a set of threat elements defined by the new threat intelligence in response to receiving positive query results from the probabilistic data structure for a threshold proportion of the external Internet Protocol address, the domain name, and the hostname.

4. The method of claim 1:
wherein recording elements representing network events to the network accounting log comprises interfacing with external intrusion detection systems arranged throughout the network to detect events occurring on the network; and
wherein compressing the network accounting log into the compressed log file comprises inserting elements comprising metadata of network events occurring on the network into the compressed log file comprising a probabilistic data structure.

5. The method of claim 1:
wherein querying the network accounting log for the threat element comprises detecting, in the network accounting log, the threat element comprising an indicator of compromise affecting a particular asset on the network; and
wherein issuing an alert to respond to the newly-identified security threat on the network comprises:
generating the alert indicating the newly-identified security threat, indicating the particular asset, and comprising a prompt to investigate the network for presence of the newly-identified security threat; and
transmitting the alert to an external security operation center.

6. A method for detecting a cyber attack comprising:
recording representations of network events occurring on a network over a period of time to a network accounting log;
writing external Internet Protocol addresses of network events represented in the network accounting log to a first probabilistic data structure in;
writing domain names of network events represented in the network accounting log to a second probabilistic data structure in the compressed log file; and
writing hostnames of network events represented in the network accounting log to a third probabilistic data structure in the compressed log file;
in response to receipt of a new threat intelligence representing a newly-identified security threat identified after the period of time:
  querying the first probabilistic data structure in the compressed log file for an external Internet Protocol address representative of the new threat intelligence;
  querying the second probabilistic data structure for a domain name representative of the threat element; and
  querying the third probabilistic data structure for a hostname representative of the threat element;
in response to receiving positive query results from the first probabilistic data structure, the second probabilistic data structure, and the third probabilistic data structure, querying the network accounting log for a set of network events defined by the new threat intelligence; and
in response to detecting the set of threat elements in the network accounting log, issuing an alert to respond to the newly-identified security threat on the network.

7. The method of claim 6, wherein issuing the alert to respond to the newly-identified security threat on the network comprises:
detecting a degree of temporal alignment between the set of network events in the network accounting log and a cyber attack pattern defined in the new threat intelligence, the cyber attack pattern defining an order of the threat elements;
calculating a confidence score, for exposure of the network to the newly-identified security threat, proportional to the degree of temporal alignment; and
transmitting the alert to an external security operation center in response to the confidence score exceeding a threshold score.

8. The method of claim 6, wherein recording representations of network events occurring on the network to the network accounting log comprises executing deep packet inspection to detect events occurring on the network.

9. A method for detecting a cyber attack comprising:
recording representations of network events occurring on a network over a period of time to a network accounting log;
compressing the network accounting log into a compressed log file representing the network events occurring within the period of time;
in response to receipt of a new threat intelligence representing a newly-identified security threat identified after the period of time, querying the compressed log file for a value representative of a threat element defined in the new threat intelligence;
in response to detecting the threat element in the compressed log file, querying the network accounting log for a set of network events that approximate threat elements defined in the new threat intelligence in response to receiving a positive query result from the compressed log file;
in response to detecting the threat element in the network accounting log, predicting exposure of the network to the newly-identified security threat during the period of time based on alignment between a sequence of the set of network events in the network accounting log and a sequence of threat elements defined by the new threat intelligence; and
in response to predicting exposure of the network to the newly-identified security threat, issuing an alert to respond to the newly-identified security threat on the network.

10. The method of claim 9:
wherein exposure of the network to the newly-identified security threat comprises
  calculating a degree of temporal alignment between the sequence and a timing of the set of network events in the network accounting log and a cyber attack pattern defined in the new threat intelligence; and
  calculating a confidence score for presence of the newly-identified security threat on the network proportional to the degree of temporal alignment; and
wherein issuing the alert to respond to the newly-identified security threat on the network comprises issuing the alert in response to the confidence score exceeding a threshold score.

11. The method of claim 10:
wherein querying the network accounting log for the threat element comprises detecting, in the network accounting log, the threat element affecting a particular asset on the network; and
further comprising, in response to the confidence score exceeding a quarantine score greater than the threshold score, automatically executing a process to quarantine the particular asset from the network to contain the newly-identified security threat.

12. A method for detecting a cyber attack comprising:
recording, to a network accounting log, representations of network events occurring on a network over a period of time of a first duration, extending up to a current time block, and excluding the current time block;
compressing the network accounting log into a compressed log file representing the network events occurring within the period of time;
recording representations of a new set of network events occurring during the current time block to a network event buffer, the current time block of a second duration less than the first duration;
in response to receipt of a new threat intelligence representing a newly-identified security threat identified during the current time block, querying the network event buffer for a threat element defined in the new threat intelligence;
in response to detecting the threat element in the network event buffer during the current time block, issuing an alert to respond to the newly-identified security threat on the network; and
in response to receiving a negative query result for the threat element from the network event buffer, querying the compressed log file for a value representative of the threat element;
in response to detecting the threat element in the compressed log file, querying the network accounting log for the threat element; and in response to detecting the threat element in the network accounting log, issuing an alert to respond to the newly-identified security threat on the network.

13. The method of claim 12:

wherein recording representations of the new set of network events occurring during the current time block to the network event buffer comprises recording, to the network event buffer, representations of the new set of network events occurring during the current time block comprising a current date; and further comprising, in response to conclusion of the current date:
  updating the network accounting log with elements in the network event buffer; and
  updating the compressed log file with metadata of elements in the network event buffer.

14. The method of claim 13, further comprising:

in response to receipt of a second threat intelligence representing a second security threat identified on a subsequent date, querying the compressed log file for a second threat element defined in the second threat intelligence;

in response to receiving a positive query result from the compressed log file, querying the network accounting log for the second threat element; and in response to detecting the second threat element in the network accounting log, issuing a second alert to respond to the second security threat on the network.

15. The method of claim 14:

further comprising accessing a database of past threat intelligence representing a set of known security threats; and wherein querying the network event buffer for the threat element comprises querying the network event buffer for threat elements defined in the new threat intelligence and in the database of past threat intelligence.

16. The method of claim 15:

wherein querying the network event buffer for threat elements defined in the new threat intelligence and in the database of past threat intelligence comprises:
  accessing a compressed threat intelligence file representing threat elements defined in the database of past threat intelligence;
  inserting threat elements defined in the new threat intelligence into the compressed threat intelligence file; and
  in response to detecting a new network event on the network during the current time block, querying the compressed threat intelligence file for metadata of the new network event; and wherein querying the network event buffer for the threat element defined in the new threat intelligence comprises querying the new threat intelligence and the database of past threat intelligence for metadata of the new network event in response to receiving a positive query result from the compressed threat intelligence file.

17. A method for detecting a cyber attack comprising:

recording representations of network events occurring on a network over a period of time to a network accounting log;

compressing the network accounting log into:
  a first compressed log file representing network events occurring within a first segment of the period of time; and
  a second compressed log file representing network events occurring with a second segment of the period of time, the second segment distinct from, temporally preceding, and of duration greater than the first segment of the period of time;

in response to receipt of a new threat intelligence representing a newly-identified security threat identified after the period of time, querying the first compressed log file for a value representative of a threat element defined in the new threat intelligence;

in response to omission of the threat element from the first compressed log file, querying the second compressed log file for the threat element;

in response to detecting the threat element in one of the first compressed log file and the second compressed log file, querying the network accounting log for the threat element; and in response to detecting the threat element in the network accounting log, issuing an alert to respond to the newly-identified security threat on the network.

18. A method for detecting a cyber attack comprising:

recording, to a network accounting log, representations of network events occurring on a network over a period of time of a first duration, extending up to a current time block, and excluding the current time block;

writing metadata values of network events in the accounting log to a compressed log file;

recording representations of a new set of network events occurring during the current time block to a network event buffer, the current time block of a second duration less than a first duration;

accessing a database of past threat intelligence representing a set of known security threats;

in response to receipt of a new threat intelligence representing a newly-identified security threat identified during the current time block, querying the network event buffer for metadata values of threat elements defined in the new threat intelligence and in the database of past threat intelligence;

in response to detecting metadata values of the threat element in the network event buffer during the current time block, issuing an alert to respond to the newly-identified security threat on the network;

in response to receipt of a new threat intelligence representing a newly-identified security threat identified after the period of time, querying the compressed log file for a set of metadata values of a threat element defined in the new threat intelligence;

in response to receiving a negative query result for the threat element from the network event buffer, querying the compressed log file for metadata values representative of the threat element;

in response to detecting the set of metadata values of the threat element in the compressed log file, querying the network accounting log for a set of threat elements defined in the new threat intelligence; and in response to detecting the set of threat elements in the network accounting log, issuing an alert to respond to the newly-identified security threat on the network.

* * * * *